US008212208B2

(12) United States Patent
Green et al.

(10) Patent No.: US 8,212,208 B2
(45) Date of Patent: Jul. 3, 2012

(54) LINEAR ION TRAP

(75) Inventors: Martin Raymond Green, Cheshire (GB); Daniel James Kenny, Knutsford (GB); David Langridge, Stockport (GB); Jason Lee Wildgoose, Stockport (GB)

(73) Assignee: Micromass UK Limited, Manchester (GB)

( * ) Notice: Subject to any disclaimer, the term of this patent is extended or adjusted under 35 U.S.C. 154(b) by 150 days.

(21) Appl. No.: 12/812,342

(22) PCT Filed: Jan. 12, 2009

(86) PCT No.: PCT/GB2009/000071

§ 371 (c)(1),
(2), (4) Date: Aug. 17, 2010

(87) PCT Pub. No.: WO2009/087402

PCT Pub. Date: Jul. 16, 2009

(65) Prior Publication Data

US 2011/0049358 A1 Mar. 3, 2011

Related U.S. Application Data

(60) Provisional application No. 61/021,960, filed on Jan. 18, 2008.

(30) Foreign Application Priority Data

Jan. 11, 2008 (GB) .................................. 0800526.6

(51) Int. Cl.
*H01J 49/00* (2006.01)
*B01D 59/44* (2006.01)

(52) U.S. Cl. ........................................ 250/283; 250/292

(58) Field of Classification Search .......... 250/281–283, 250/292

See application file for complete search history.

(56) References Cited

U.S. PATENT DOCUMENTS

| | | | | |
|---|---|---|---|---|
| 6,075,244 | A * | 6/2000 | Baba et al. | 250/292 |
| 6,177,668 | B1 | 1/2001 | Hager | |
| 7,084,398 | B2 | 8/2006 | Loboda et al. | |
| 7,456,388 | B2 * | 11/2008 | Loboda et al. | 250/281 |
| 2005/0263695 | A1 * | 12/2005 | Syka | 250/291 |
| 2007/0158545 | A1 | 7/2007 | Verentchikov | |

FOREIGN PATENT DOCUMENTS

| | | |
|---|---|---|
| WO | 2007052025 | 5/2007 |

* cited by examiner

*Primary Examiner* — Jack Berman
*Assistant Examiner* — David E Smith
(74) *Attorney, Agent, or Firm* — Diederiks & Whitelaw PLC

(57) ABSTRACT

A linear ion trap (6, 7, 8)is disclosed comprising a central quadrupole rod set (6)and a post-filter quadrupole rod set (8). A 180° phase difference is maintained between axially adjacent rod electrodes of the central quadrupole rod set (6) and the post-filter quadrupole (8) so that an axial pseudo-potential barrier is created between the central quadrupole rod set (6) and the post-filter quadrupole (8). A supplementary AC voltage is applied to the rods of the central quadrupole (6) in order to radially excite ions which are desired to be ejected from the ion trap. The ions are ejected from the ion trap (6, 7, 8) non-adiabatically in an axial direction.

15 Claims, 6 Drawing Sheets

LINEAR ION TRAP

Figure 1A:
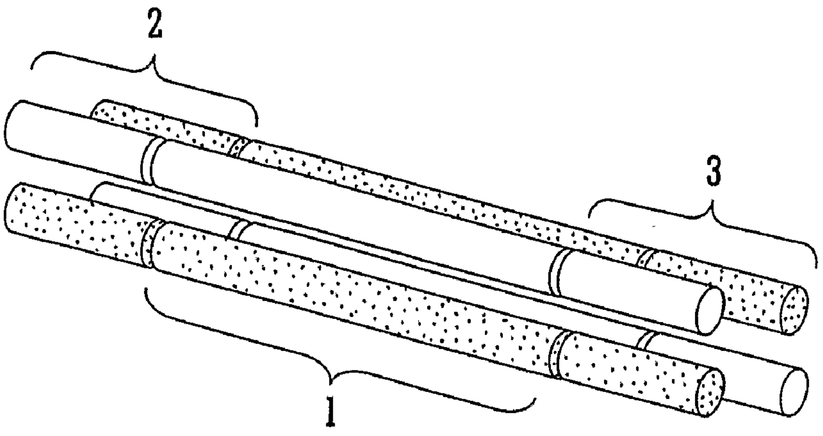
FIG. 1A PRIOR ART

This application is the nationalization of International Application No. PCT/US2009/000071, filed 12 Jan. 2009 and designating the United States, which claims benefit of and priority to United Kingdom Patent Application No. 0800526.6 filed 11 filed Jan. 2008, and Provisional Patent Application No. 61/021,960, filed on 18 Jan. 2008. The contents of these applications are incorporated herein, by reference, in their entirety.

The present invention relates to a linear ion trap, a mass spectrometer, a method of trapping ions and a method of mass spectrometry.

It is well known that the time averaged force on a charged particle or ion due to an AC inhomogeneous electric field is such as to accelerate the charged particle or ion to a region where the electric field is weaker. A minimum in the electric field is commonly referred to as being a pseudo-potential well or valley. Correspondingly, a maximum in the electric field is commonly referred to as being a pseudo-potential hill or barrier. RF ion guides are designed to exploit this phenomenon by causing a pseudo-potential well to be formed along the central longitudinal axis of the ion guide so that ions are confined radially within the ion guide.

Different forms of RF ion guide are known including conventional multipole rod set ion guides and more recently ring stack or ion tunnel ion guides. A ring stack or ion tunnel ion guide comprises a plurality of ring electrodes arranged in a line. Ions are transmitted through the central aperture in the ring electrodes. Opposite phases of an RF voltage are applied to adjacent ring electrodes so that a pseudo-potential well is formed along the central axis of the ion guide so that ions are confined radially within the ion guide.

A well known device closely associated to an RF ion guide is a quadrupole rod set mass filter (QMF). A quadrupole mass filter Comprises four elongated rod electrodes. A combination of AC and DC voltages is applied to the rod electrodes and for particular combinations of applied AC and DC voltages only ions having particular mass to charge ratios will have stable trajectories as they pass through the quadrupole mass filter. As a result, only those ions having mass to charge ratios which fall within a well defined band will be onwardly transmitted by the quadrupole mass filter. Other ions will have unstable trajectories as they pass through the quadrupole mass filter and hence will be lost to the system and thus attenuated.

A known problem with quadrupole mass filters is that fringing fields can form at the entrance and exit of the quadrupole mass filter which can act to defocus the ion beam. This has the effect of restricting the overall ion transmission. A solution to this problem was first proposed by Brubaker (U.S. Pat. No. 3,129,327) and involves essentially segmenting the quadrupole to provide short entrance and exit quadrupoles. However, RF-only voltages are applied to the entrance and exit quadrupoles i.e. ions are not mass filtered by the entrance and exit quadrupoles. This arrangement is known as a delayed DC-ramp and the RF-only quadrupoles are sometimes referred to as Brubaker lenses, pre- and post-filters or stubbies.

A known quadrupole arrangement employing a quadrupole pre-filter and a quadrupole post-filter is shown schematically in FIG. 1A. As shown in FIG. 1A, a short pre-filter 2 is arranged upstream of a central quadrupole 1. A short post-filter 3 is also arranged downstream of the central quadrupole 1.

Figure 1B:
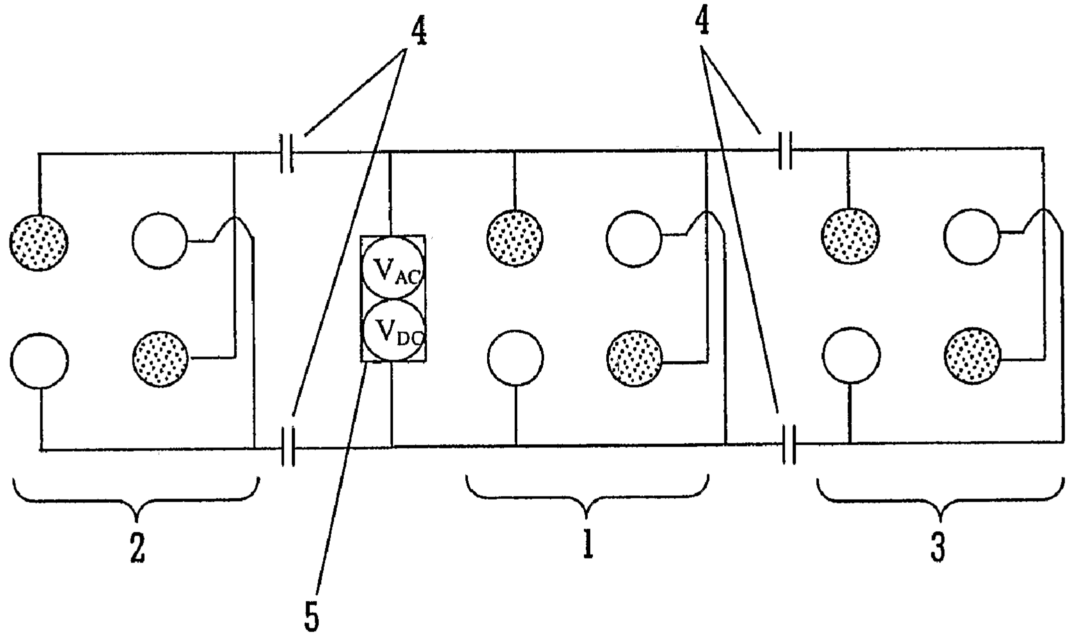
FIG. 1B PRIOR ART

FIG. 1B shows a conventional circuit which is arranged to supply appropriate RF voltages to the rods of the pre-filter 2, the rods of the central quadrupole 1 and the rods of the post-filter 3. A single RF/DC source is used to drive the central quadrupole 1. The rods of the pre-filter 2 and the rods of the post-filter 3 are capactively coupled to the adjacent rods of the central quadrupole 1 such that a substantial proportion of the RF voltage applied to the rods of the central quadrupole 1 is also applied to the rods of the pre-filter 2 and the rods of the post-filter 3. However, no resolving DC voltage is applied to the electrodes of the pre-filter 2 or the electrodes of the post-filter 3. Extra connections (not shown) may be used to provide further DC and supplementary RF voltages to the electrodes.

A linear ion trap comprises a plurality of rod or ring electrodes and additional electrodes which are used to confine ions axially within the ion trap. A linear ion trap is known which comprises a central quadrupole with short entrance and exit quadrupoles. DC voltages are applied to the entrance and exit quadrupoles in order to confine ions axially within the ion trap. Ions may be ejected resonantly through slots in the confining electrodes by applying a di-polar supplementary AC voltage to the quadrupole electrodes.

A low resolution linear ion trap is disclosed in U.S. Pat. No. 7,084,398 (Loboda) wherein an RF voltage is applied to an elongated rod set in order to confine ions radially within the ion guide. An axial RF electric field is produced at the exit of the ion guide by the application of an RF voltage to an electrode external to the elongated rod set. The RF axial electric field generates an axial pseudo-potential barrier which acts as a barrier to ions. The magnitude of the pseudo-potential barrier is inversely dependent upon the mass to charge ratio of the ions. As a result, ions having a relatively low mass to charge ratio will experience a pseudo-potential barrier which has a relatively large amplitude. In order to eject ions axially from the ion guide, a static axial electric field is arranged to propel ions along the axis of the ion guide. The pseudo-potential barrier counteracts the effect of the static axial field for ions having relatively low mass to charge ratios but does not sufficiently counteract the effect of the static axial field upon ions having relatively high mass to charge ratios. Therefore, ions having relatively high mass to charge ratios will be ejected axially from the ion guide. Ions may be mass selectively ejected by adjusting either the amplitude of the static axial electric field or the amplitude of the pseudo-potential barrier. However, the known ion trap suffers from a relatively poor mass resolution for ion ejection.

It is desired to provide an improved ion trap.

According to an aspect of the present invention there is provided an ion trap comprising:

a first quadrupole rod set comprising a plurality of first electrodes;

a second quadrupole rod set comprising a plurality of second electrodes, the second quadrupole rod set being arranged downstream of the first quadrupole rod set;

a first device which is arranged and adapted to apply a first AC or RF voltage to at least some of the first electrodes and at least some of the second electrodes such that in a first mode of operation a non-zero phase difference is maintained between at least some of the first electrodes and at least some corresponding axially adjacent second electrodes so that an axial pseudo-potential barrier is created between the first quadrupole rod set and the second quadrupole rod set; and a second device which is arranged and adapted to apply one or more supplementary AC voltages to at least some of the first electrodes so that at least some ions within the first quadrupole rod set are resonantly excited in a radial direction and are subsequently ejected in an axial direction from the first quadrupole rod set.

The first device preferably applies a first AC or RF voltage to at least some of the first electrodes and at least some of the second electrodes. The first device may comprise a single AC or RF generator or alternatively the first device may comprise two or more AC or RF generators. The present invention should be considered as covering embodiments wherein essentially the same AC or RF voltage is applied to the first and second electrodes and also embodiments wherein a first AC or RF voltage is applied to the first electrodes and a second different AC or RF voltage is applied to the second electrodes.

According to the preferred embodiment the rods of the second quadrupole are preferably arranged to be co-axial with the rods of the first quadrupole. According to this embodiment one rod of the first quadrupole will be closest to (and hence considered axially adjacent to) one rod of the second quadrupole. It should therefore be understood that rods from different quadrupole rod sets which are closest to each other may be considered to be axially adjacent.

Other less preferred embodiments are contemplated wherein the rods of the second quadrupole rod set are not co-axial with the rods of the first quadrupole rod set. Instead, the rods of the second quadrupole rod set may be rotated relative to the rods of the first quadrupole rod set. If the rods of the second quadrupole rod set are angled at exactly 45° relative to the rods of the first quadrupole rod set, then a rod of the first quadrupole rod set will be equidistant from two rods of the second quadrupole rod set. According to this particular embodiment, the phase difference between a rod of the first quadrupole rod set and one of the two closest rods of the second quadrupole rod set may be zero whilst the phase difference between the same rod of the first quadrupole rod set and the other of the two closest rods of the second quadrupole rod set will be non-zero. Such an embodiment is intended to fall within the scope of the present invention.

The first quadrupole rod set preferably comprises a first rod electrode having a central longitudinal axis, a second rod electrode having a central longitudinal axis, a third rod electrode having a central longitudinal axis and a fourth rod electrode having a central longitudinal axis. The second quadrupole rod set preferably comprises a fifth rod electrode having a central longitudinal axis, a sixth rod electrode having a central longitudinal axis, a seventh rod electrode having a central longitudinal axis and an eighth rod electrode having a central longitudinal axis.

According to the preferred embodiment:

(i) a central longitudinal axis of the first quadrupole rod set is aligned or co-axial with a central longitudinal axis of the second quadrupole rod set; and/or (ii) the central longitudinal axis of at least some or all of the first electrodes are aligned or co-axial with the central longitudinal axis of at least some or all of the second electrodes; and/or (iii) the central longitudinal axis of the first rod electrode is axially adjacent to and/or is co-axial with the central longitudinal axis of the fifth rod electrode; and/or (iv) the central longitudinal axis of the second rod electrode is axially adjacent to and/or is co-axial with the central longitudinal axis of the sixth rod electrode; and/or (v) the central longitudinal axis of the third rod electrode is axially adjacent to and/or is co-axial with the central longitudinal axis of the seventh rod electrode; and/or (vi) the central longitudinal axis of the fourth rod electrode is axially adjacent to and/or is co-axial with the central longitudinal axis of the eighth rod electrode.

According to a less preferred embodiment:

(i) a central longitudinal axis of the first quadrupole rod set is aligned or co-axial with a central longitudinal axis of the second quadrupole rod set; and/or (ii) the central longitudinal axis of at least some or all of the first electrodes are rotated relative to and/or are non co-axial with the central longitudinal axis of at least some or all of the second electrodes; and/or (iii) the central longitudinal axis of the first rod electrode is rotated relative to and/or is non co-axial with the central longitudinal axis of the fifth rod electrode; and/or (iv) the central longitudinal axis of the second rod electrode is rotated relative to and/or is non co-axial with the central longitudinal axis of the sixth rod electrode; and/or (v) the central longitudinal axis of the third rod electrode is rotated relative to and/or is non co-axial with the central longitudinal axis of the seventh rod electrode; and/or (vi) the central longitudinal axis of the fourth rod electrode is rotated relative to and/or is non co-axial with the central longitudinal axis of the eighth rod electrode.

According to a less preferred embodiment:

(i) a central longitudinal axis of the first quadrupole rod set is axially offset from a central longitudinal axis of the second quadrupole rod set; and/or (ii) the central longitudinal axis of at least some or all of the first electrodes is axially offset from the central longitudinal axis of at least some or all of the second electrodes; and/or (iii) the central longitudinal axis of the first rod electrode is axially offset from the central longitudinal axis of the fifth rod electrode; and/or (iv) the central longitudinal axis of the second rod electrode is axially offset from the central longitudinal axis of the sixth rod electrode; and/or (v) the central longitudinal axis of the third rod electrode is axially offset from the central longitudinal axis of the seventh rod electrode; and/or (vi) the central longitudinal axis of the fourth rod electrode is axially offset from the central longitudinal axis of the eighth rod electrode.

According to a less preferred embodiment:

(i) a central longitudinal axis of the first quadrupole rod set is axially offset from a central longitudinal axis of the second quadrupole rod set; and/or (ii) the central longitudinal axis of at least some or all of the first electrodes is rotated relative to and/or is non co-axial with the central longitudinal axis of at least some or all of the second electrodes; and/or (iii) the central longitudinal axis of the first rod electrode is rotated relative to and/or is non co-axial with the central longitudinal axis of the fifth rod electrode; and/or (iv) the central longitudinal axis of the second rod electrode is rotated relative to and/or is non co-axial with the central longitudinal axis of the sixth rod electrode; and/or (v) the central longitudinal axis of the third rod electrode is rotated relative to and/or is non co-axial with the central longitudinal axis of the seventh rod electrode; and/or (vi) the central longitudinal axis of the fourth rod electrode is rotated relative to and/or is non co-axial with the central longitudinal axis of the eighth rod electrode.

According to an embodiment:

(i) the centre of a downstream end of the first rod electrode is within $x_1$ mm of the centre of an upstream end of the fifth rod electrode; and/or (ii) the centre of a downstream end of the second rod electrode is within $x_1$ mm of the centre of an upstream end of the sixth rod electrode; and/or (iii) the centre of a downstream end of the third rod electrode is within $x_1$ mm of the centre of an upstream end of the seventh rod electrode; and/or (iv) the centre of the downstream end of the fourth rod electrode is within $x_1$ mm of the centre of an upstream end of the eighth rod electrode;

wherein $x_1$ is selected from the group consisting of: (i) <1 mm; (ii) 1-2 mm; (iii) 2-3 mm; (iv) 3-4 mm; (v) 4-5 mm; (vi) 5-6 mm; (vii) 6-7 mm; (viii) 7-8 mm; (ix) 8-9 mm; (x) 9-10 mm; (xi) 10-15 mm; (xii) 15-20 mm; (xiii) 20-25 mm; (xiv) 25-30 mm; (xv) 30-35 mm; (xvi) 35-40 mm; (xvii) 40-45 mm; (xviii) 45-50 mm; and (xix) >50 mm.

According to an embodiment:

(i) the first electrodes and the second electrodes have substantially the same or substantially different diameters; and/or (ii) the first electrodes and the second electrodes have substantially the same inscribed radius or a substantially different inscribed radius; and/or (iii) the first electrodes and the second electrodes have substantially the same cross-sectional profile or substantially different cross-sectional profiles; and/or (iv) the first electrodes and the second electrodes have substantially the same physical properties or have substantially different physical properties.

According to an embodiment:

(i) the phase difference between the first rod electrode and the fifth rod electrode is arranged to be θ1°; and/or (ii) the phase difference between the second rod electrode and the sixth rod electrode is arranged to be θ2°; and/or (iii) the phase difference between the third rod electrode and the seventh rod electrode is arranged to be θ3°; and/or (iv) the phase difference between the fourth rod electrode and the eighth rod electrode is arranged to be θ4°;

wherein θ1° and/or θ2° and/or θ3° and/or θ4° are selected from the group consisting of: (i) >0°; (ii) 5-10°; (iii) 10-15°; (iv) 15-20°; (v) 20-25°; (vi) 25-30°; (vii) 30-35°; (viii) 35-40°; (ix) 40-45°; (x) 45-50°; (xi) 50-55°; (xii) 55-60°; (xiii) 60-65°; (xiv) 65-70°; (xv) 70-75°; (xvi) 75-80°; (xvii) 80-85°; (xviii) 85-90°; (xix) 90-95°; (xx) 95-100°; (xxi) 100-105°; (xxii) 105-110°; (xxiii) 110-115°; (xxiv) 115-120°; (xxv) 120-125°; (xxvi) 125-130°; (xxvii) 130-135°; (xxviii) 135-140°; (xxix) 140-145°; (xxx) 145-150°; (xxxi) 150-155°; (xxvii) 155-160°; (xxxiii) 160-165°; (xxxiv) 165-170°; (xxxv) 170-175°; (xxvi) 175-180°; and (xxvii) 180°.

Embodiments are also contemplated wherein θ1° and/or θ2° and/or θ3° and/or θ4° may be >0° and <5°.

According to an embodiment:

(i) the first quadrupole rod set and the second quadrupole rod set may comprise electrically isolated sections of the same set of electrodes and/or wherein the first quadrupole rod set and the second quadrupole set are formed mechanically from the same set of electrodes; and/or (ii) the first quadrupole rod set may comprise a region of a set of electrodes having a dielectric coating and the second quadrupole set comprises a different region of the same set of electrodes.

The axial separation between a downstream end of the first quadrupole rod set and an upstream end of the second quadrupole rod set is preferably selected from the group consisting of: (i) <1 mm; (ii) 1-2 mm; (iii) 2-3 mm; (iv) 3-4 mm; (v) 4-5 mm; (vi) 5-6 mm; (vii) 6-7 mm; (viii) 7-8 mm; (ix) 8-9 mm; (x) 9-10 mm; (xi) 10-15 mm; (xii) 15-20 mm; (xiii) 20-25 mm; (xiv) 25-30 mm; (xv) 30-35 mm; (xvi) 35-40 mm; (xvii) 40-45 mm; (xviii) 45-50 mm and (xix) >50 mm.

The axial separation between a first point along a central longitudinal axis of the first quadrupole rod set, wherein the first point is in a plane with the downstream ends of the first electrodes, and a second point along a central longitudinal axis of the second quadrupole rod set, wherein the second point is in a plane with the upstream ends of the second electrodes, is preferably selected from the group consisting of: (i) <1 mm; (ii) 1-2 mm; (iii) 2-3 mm; (iv) 3-4 mm; (v) 4-5 mm; (vi) 5-6 mm; (vii) 6-7 mm; (viii) 7-8 mm; (ix) 8-9 mm; (x) 9-10 mm; (xi) 10-15 mm; (xii) 15-20 mm; (xiii) 20-25 mm; (xiv) 25-30 mm; (xv) 30-35 mm; (xvi) 35-40 mm; (xvii) 40-45 mm; (xviii) 45-50 mm; and (xix) >50 mm.

The first quadrupole set preferably has a first axial length and the second quadrupole rod set preferably has a second axial length. According to an embodiment the first axial length is preferably substantially greater than the second axial length and/or the ratio of the first axial length to the second axial length is preferably at least 2, 3, 4, 5, 6, 7, 8, 9, 10, 11, 12, 13, 14, 15, 16, 17, 18, 19, 20, 25, 30, 35, 40, 45 or 50. According to another embodiment the second axial length may be substantially greater than the first axial length and/or the ratio of the second axial length to the first axial length may be at least 2, 3, 4, 5, 6, 7, 8, 9, 10, 11, 12, 13, 14, 15, 16, 17, 18, 19, 20, 25, 30, 35, 40, 45 or 50. In particular, if ions are energetically ejected from the first quadrupole rod set then it is contemplated that the second quadrupole rod set may be longer than the first quadrupole rod set in order to enable the kinetic energy of the ions to be reduced before the ions are onwardly transmitted to another ion-optical component such as a Time of Flight mass analyser.

The first quadrupole rod set preferably comprises a first central longitudinal axis and wherein:

(i) there is a direct line of sight along the first central longitudinal axis; and/or (ii) there is substantially no physical axial obstruction along the first central longitudinal axis; and/or (iii) ions transmitted, in use, along the first central longitudinal axis are transmitted with an ion transmission efficiency of substantially 100%.

The second quadrupole rod set preferably comprises a second central longitudinal axis and wherein:

(i) there is a direct line of sight along the second central longitudinal axis; and/or (ii) there is substantially no physical axial obstruction along the second central longitudinal axis; and/or (iii) ions transmitted, in use, along the second central longitudinal axis are transmitted with an ion transmission efficiency of substantially 100%.

The first device is preferably arranged and adapted to apply a first AC or RF voltage to the first quadrupole rod set and/or a second AC or RF voltage to the second quadrupole rod set. Such an embodiment should be construed as falling within the scope of the present invention.

According to an embodiment the first AC or RF voltage and/or the second AC or RF voltage preferably has an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; (xi) 500-1000 V peak to peak; (xii) 1-2 kV peak to peak; (xiii) 2-3 kV peak to peak; (xiv) 3-4 kV peak to peak; (xv) 4-5 kV peak to peak; (xvi) 5-6 kV peak to peak; (xvii) 6-7 kV peak to peak; (xviii) 7-8 kV peak to peak; (xix) 8-9 kV peak to peak; (xx) 9-10 kV peak to peak; (xxi) 10-11 kV peak to peak; (xxii) 11-12 kV peak to peak; (xxiii) 12-13 kV peak to peak; (xxiv) 13-14 kV peak to peak; (xxv) 14-15 kV peak to peak; (xxvi) 15-16 kV peak to peak; (xxvii)

16-17 kV peak to peak; (xxviii) 17-18 kV peak to peak; (xxix) 18-19 kV peak to peak; (xxx) 19-20 kV peak to peak; and (xxxi) >20 kV.

According to an embodiment the first AC or RF voltage and/or the second AC or RF voltage preferably has a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0. MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

According to an embodiment the first AC or RF voltage and the second AC or RF voltage preferably have substantially the same amplitude and/or substantially the same frequency. According to alternative embodiments the amplitude and/or frequency of the first AC or RF voltage and the second AC or RF voltage may differ by <10%, 10-20%, 20-30%, 30-40%, 40-50%, 50-60%, 60-70%, 70-80%, 80-90%, 90-100% or >100%.

The first device may be arranged and adapted to maintain the frequency and/or amplitude and/or phase of the first AC or RF voltage and/or the second AC or RF voltage substantially constant with time during a mode of operation. Alternatively, the first device may be arranged and adapted to vary, increase, decrease or scan the frequency and/or amplitude and/or phase of the first AC or RF voltage and/or the second AC or RF voltage in a mode of operation.

According to an embodiment at least some or substantially all ions which are ejected in an axial direction from the first quadrupole rod set pass across the axial pseudo-potential barrier and enter the second quadrupole rod set.

According to an embodiment at the second device may be arranged and adapted to vary, increase, decrease or alter the radial displacement of at least some ions within the first quadrupole rod set.

According to the preferred embodiment the second device is preferably arranged and adapted to apply the one or more supplementary AC voltages in order to excite in a mass or mass to charge ratio selective manner at least some ions, radially within the first quadrupole rod set so that the ions increase their radial motion within the first quadrupole rod set.

According to an embodiment the one or more supplementary AC voltages may have an amplitude selected from the group consisting of: (i) <50 mV peak to peak; (ii) 50-100 mV peak to peak; (iii) 100-150 mV peak to peak; (iv) 150-200 mV peak to peak; (v) 200-250 mV peak to peak; (vi) 250-300 mV peak to peak; (vii) 300-350 mV peak to peak; (viii) 350-400 mV peak to peak; (ix) 400-450 mV peak to peak; (x) 450-500 mV peak to peak; and (xi) >500 mV peak to peak.

According to an embodiment the one or more supplementary AC voltages may have a frequency selected from the group consisting of: (i) <10 kHz; (ii) 10-20 kHz; (iii) 20-30 kHz; (iv) 30-40 kHz; (v) 40-50 kHz; (vi) 50-60 kHz; (vii) 60-70 kHz; (viii) 70-80 kHz; (ix) 80-90 kHz; (x) 90-100 kHz; (xi) 100-110 kHz; (xii) 110-120 kHz; (xiii) 120-130 kHz; (xiv) 130-140 kHz; (xv) 140-150 kHz; (xvi) 150-160 kHz; (xvii) 160-170 kHz; (xviii) 170-180 kHz; (xix) 180-190 kHz; (xx) 190-200 kHz; and (xxi) 200-250 kHz; (xxii) 250-300 kHz; (xviii) 300-350 kHz; (xxiv) 350-400 kHz; (xxv) 400-450 kHz; (xxvi) 450-500 kHz; (xxvii) 500-600 kHz; (xxviii) 600-700. kHz; (xxix) 700-800 kHz; (xxx) 800-900 kHz; (xxxi) 900-1000 kHz; and (xxxii) >1 MHz.

The second device may be arranged and adapted to maintain the frequency and/or amplitude and/or phase of the one or more supplementary AC voltages applied to at least some of the first electrodes substantially constant. Alternatively, the second device may be arranged and adapted to vary, increase, decrease or scan the frequency and/or amplitude and/or phase of the one or more supplementary AC voltages applied to at least some of the first electrodes.

According to the preferred embodiment in a mode of operation ions are ejected substantially non-adiabatically from the ion trap in an axial direction and/or with axial energy being substantially imparted to the ions.

According to the preferred embodiment ions are ejected axially from the ion trap in an axial direction with a mean axial kinetic energy selected from the group consisting of: (i) <10 eV; (ii) 10-20 eV; (iii) 20-30 eV; (iv) 30-40 eV; (v) 40-50 eV; (vi) 50-60 eV; (vii) 60-70 eV; (viii) 70-80 eV; (ix) 80-90 eV; (x) 90-100 eV; and (xi) >100 eV.

According to the preferred embodiment ions are preferably ejected axially from the ion trap in an axial direction and wherein the standard deviation of the axial kinetic energy is preferably selected from the group consisting of: (i) <10 eV; (ii) 10-20 eV; (iii) 20-30 eV; (iv) 30-40 eV; (v) 40-50 eV; (vi) 50-60 eV; (vii) 60-70 eV; (viii) 70-80 eV; (ix) 80-90 eV; (x) 90-100 eV; and (xi) >100 eV.

According to an embodiment in a mode of operation multiple different species of ions having different mass to charge ratios are simultaneously ejected axially from the ion trap in substantially the same and/or substantially different axial directions.

According to an embodiment in a mode of operation ions which are not desired to be axially ejected at an instance in time are not radially excited or are radially excited to a lesser or insufficient degree.

According to an embodiment ions which are desired to be axially ejected from the ion trap at an instance in time are mass selectively ejected from the ion trap and/or ions which are not desired to be axially ejected from the ion trap at the instance in time are not mass selectively ejected from the ion trap.

According to an embodiment the second device is preferably arranged and adapted to resonantly excite at least some ions in a radial direction so that the ions are non-adiabatically ejected from the first quadrupole rod set in an axial direction.

The following relationship may be used to define an adiabaticity parameter $\eta$:

$$\eta = \frac{2q|\nabla E_0|}{m\Omega^2}$$

wherein q is charge, $E_0$ is electric field, m is mass and $\omega$ is the RF frequency. According to an embodiment ions may be deemed as being non-adiabatically ejected from the first quadrupole rod set when $\eta>0.3$.

According to an embodiment the second device is preferably arranged and adapted to resonantly excite at least some ions in a radial direction so that the ions are non-adiabatically ejected from the first quadrupole rod set in an axial ejection and wherein for those ions which are non-adiabatically ejected from the first quadrupole rod set $\eta$ is arranged to have a value selected from the group consisting of: (i) 0.3-0.4; (ii) 0.4-0.5; (iii) 0.5-0.6; (iv) 0.6-0.7; (v) 0.7-0.8; (vi) 0.8-0.9; and (vii) >0.9.

According to an embodiment the ion trap preferably further comprises a third device which is arranged and adapted to apply either:

(i) one or more DC voltages to one or more of the second electrodes so as to assist in confining at least some ions axially within the first quadrupole rod set; and/or (ii) one or more additional AC voltages to one or more, of the second electrodes so as to assist in confining at least some ions axially within the first quadrupole rod set.

The one or more additional AC voltages preferably result in an additional pseudo-potential barrier being generated or otherwise contribute to the amplitude of the pseudo-potential barrier between the first quadrupole rod set and the second quadrupole rod set.

The one or more additional AC voltages applied to one or more of the second electrodes preferably have an amplitude in the range <10 V, 10-20 V, 20-30 V, 30-40 V, 40-50 V, 50-60 V, 60-70 V, 70-80 V, 80-90 V, 90-100 V or >100 V. The amplitude of the one or more additional AC voltages applied to one or more of the second electrodes is preferably selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

The third device is preferably arranged and adapted either:

(i) to apply the one or more DC voltages to one or more of the second electrodes so as to vary, increase, decrease or scan the amplitude of a DC trapping field, a DC potential barrier or barrier field whilst ions are being ejected axially from the ion trap in a mode of operation; and/or (ii) to apply the one or more additional AC voltages to one or more of the second electrodes so as to vary, increase, decrease or scan the amplitude of a pseudo-potential barrier or barrier field whilst ions are being ejected axially from the ion trap in a mode of operation.

According to an embodiment:

(a) in a mode of operation at least some ions are arranged to be trapped or isolated in one or more upstream and/or intermediate and/or downstream regions of the ion trap; and/or (b) in a mode of operation at least some ions are arranged to be fragmented in one or more upstream and/or intermediate and/or downstream regions of the ion trap; and/or (c) in a mode of operation at least some ions are arranged to be separated temporally according to their ion mobility or rate of change of ion mobility with electric field strength as they pass along at least a portion of the length of the ion trap; and/or (d) in a mode of operation the ion trap is arranged and adapted to be maintained at a pressure selected from the group consisting of: (i) >100 mbar; (ii) >10 mbar; (iii) >1 mbar; (iv) >0.1 mbar; (v) $>10^{-2}$ mbar; (vi) $>10^{-3}$ mbar; (vii) $>10^{-4}$ mbar; (viii) $>10^{-5}$ mbar; (ix) $>10^{-6}$ mbar; (x) <100 mbar; (xi) <10 mbar; (xii) <1 mbar; (xiii) <0.1 mbar; (xiv) $<10^{-2}$ mbar; (xv) $<10^{-3}$ mbar; (xvi) $<10^{-4}$ mbar; (xvii) $<10^{-5}$ mbar; (xviii) $<10^{-6}$ mbar; (xix) 10-100 mbar; (xx) 1-10 mbar; (xxi) 0.1-1 mbar; (xxii) $10^{-2}$ to $10^{-1}$ mbar; (xxiii) $10^{-3}$ to $10^{-2}$ mbar; (xxiv) $10^{-4}$ to $10^{-3}$ mbar; and (xxv) $10^{-5}$ to $10^{-4}$ mbar; and/or (e) in a mode of operation at least some ions are arranged to be fragmented or reacted within a portion of the ion trap and wherein the ions are arranged to be fragmented by: (i) Collisional Induced Dissociation ("CID"); (ii) Surface Induced Dissociation ("SID"); (iii) Electron Transfer Dissociation ("ETD"); (iv) Electron Capture Dissociation ("ECD"); (v) Electron Collision or Impact Dissociation; (vi) Photo Induced Dissociation ("PID"); (vii) Laser Induced Dissociation; (viii) infrared radiation induced dissociation; (ix) ultraviolet radiation induced dissociation; (x) thermal or temperature dissociation; (xi) electric field induced dissociation; (xii) magnetic field induced dissociation; (xiii) enzyme digestion or enzyme degradation dissociation; (xiv) ion-ion reaction dissociation; (xv) ion-molecule reaction dissociation; (xvi) ion-atom reaction dissociation; (xvii) ion-metastable ion reaction dissociation; (xviii) ion-metastable molecule reaction dissociation; (xix) ion-metastable atom reaction dissociation; or (xx) Electron Ionisation Dissociation ("EID").

The ion trap preferably further comprises a device, an ion gate or additional ion trap for pulsing ions into the ion trap and/or for converting a substantially continuous ion beam into a pulsed ion beam, wherein the device, ion gate or additional ion trap is arranged upstream and/or downstream of the ion trap.

The ion trap is preferably also arranged and adapted to be operated in a second different mode of operation wherein either:

(i) DC and/or AC or RF voltages are applied to one or more of the first electrodes and/or to one or more of the second electrodes that the ion trap operates as an RF-only ion guide or an ion guide wherein ions are not confined axially; and/or (ii) DC and/or AC or RF voltages are applied to one or more of the first electrodes and/or to one or more of the second electrodes so that the ion trap operates as a mass filter or a mass analyser wherein ions are mass selectively transmitted and wherein ions are not confined axially.

According to an embodiment in a mode of operation substantially the same amplitude and/or substantially the same frequency and/or substantially the same phase of an AC or RF voltage may be applied to the rods of the first quadrupole rod set and to the rods of the second quadrupole rod set in order to confine ions radially within the first quadrupole rod set and/or the second quadrupole rod set. According to this embodiment the ion trap preferably operates as a conventional ion guide and ions are not confined axially within the device.

According to an embodiment the ion trap preferably further comprises a third quadrupole rod set comprising a plurality of third electrodes. The third quadrupole rod set is preferably arranged upstream of the first quadrupole rod set.

In the first mode of operation a zero phase difference is preferably maintained between at least some of the third electrodes and at least some corresponding axially adjacent or neighbouring first electrodes. As a result, no pseudo-potential barrier is preferably formed or created between the third quadrupole rod set and the first quadrupole rod set.

The third quadrupole rod set preferably comprises a ninth rod electrode having a central longitudinal axis, a tenth rod electrode having a central longitudinal axis, an eleventh rod electrode having a central longitudinal axis and a twelfth rod electrode having a central longitudinal axis.

According to the preferred embodiment:

(i) a central longitudinal axis of the third quadrupole rod set is aligned or co-axial with a central longitudinal axis of the first quadrupole rod set; and/or (ii) the central longitudinal axis of at least some or all of the third electrodes is aligned or co-axial with the central longitudinal axis of at least some or all of the first electrodes; and/or (iii) the central longitudinal axis of the first rod electrode is axially adjacent to and/or is co-axial with the central longitudinal axis of the ninth rod electrode; and/or (iv) the central longitudinal axis of the second rod electrode is axially adjacent to and/or is co-axial with the central longitudinal axis of the tenth rod electrode; and/or (v) the central longitudinal axis of the third rod electrode is axially adjacent to and/or is co-axial with the central longitudinal axis of the eleventh rod electrode; and/or (vi) the central longitudinal axis of the fourth rod electrode is axially adjacent to and/or is co-axial with the central longitudinal axis of the twelfth rod electrode.

According to an embodiment:

(i) the centre of a downstream end of the ninth rod electrode is within $x_2$ mm of the centre of an upstream end of the first rod electrode; and/or (ii) the centre of a downstream end of the tenth rod electrode is within $x_2$ mm of the centre of an upstream end of the second rod electrode; and/or (iii) the centre of a downstream end of the eleventh rod electrode is within $x_2$ mm of the centre of an upstream end of the third rod electrode; and/or (iv) the centre of the downstream end of the twelfth rod electrode is within $x_2$ mm of the centre of an upstream end of the fourth rod electrode;

wherein $x_2$ is selected from the group consisting of: (i) <1 mm; (ii) 1-2 mm; (iii) 2-3 mm; (iv) 3-4 mm; (v) 4-5 mm; (vi) 5-6 mm; (vii) 6-7 mm; (viii) 7-8 mm; (ix) 8-9 mm; (x) 9-10 mm; (xi) 10-15 mm; (xii) 15-20 mm; (xiii) 20-25 mm; (xiv) 25-30 mm; (xv) 30-35 mm; (xvi) 35-40 mm; (xvii) 40-45 mm; (xviii) 45-50 mm; and (xix) >50 mm.

According to the preferred embodiment:

(i) the first electrodes and the third electrodes have substantially the same diameters; and/or (ii) the first electrodes and the third electrodes have substantially the same inscribed radius; and/or (iii) the first electrodes and the third electrodes have substantially the same cross-sectional profile; and/or (iv) the first electrodes and the third electrodes have substantially the same physical properties.

According to the preferred embodiment:

(i) the phase difference between the first rod electrode and the ninth rod electrode is arranged to be θ5°; and/or (ii) the phase difference between the second rod electrode and the tenth rod electrode is arranged to be θ6°; and/or (iii) the phase difference between the third rod electrode and the eleventh rod electrode is arranged to be θ7°; and/or (iv) the phase difference between the fourth rod electrode and the twelfth rod electrode is arranged to be θ8°;

wherein θ5° and/or θ6° and/or θ7° and/or θ8° are arranged to be 0°.

Less preferred embodiment are contemplated wherein θ5° and/or θ6° and/or θ7° and/or θ8° are <10°, <20°, <30°, <40° or <50°.

According to an embodiment:

(i) the first quadrupole rod set and the third quadrupole rod set comprise electrically isolated sections of the same set of electrodes and/or wherein the first quadrupole rod set and the third quadrupole set are formed mechanically from the same set of electrodes; and/or (ii) the first quadrupole rod set comprises a region of a set of electrodes having a dielectric coating and the third quadrupole set comprises a different region of the same set of electrodes.

According to an embodiment:

(i) the axial separation between a downstream end of the third quadrupole rod set and an upstream end of the first quadrupole rod set is selected from the group consisting of: (i)<1 mm; (ii) 1-2 mm; (iii) 2-3 mm; (iv) 3-4 mm; (v) 4-5 mm; (vi) 5-6 mm; (vii) 6-7 mm; (viii) 7-8 mm; (ix) 8-9 mm; (x) 9-10 mm; (xi) 10-15 mm; (xii) 15-20 mm; (xiii) 20-25 mm; (xiv) 25-30 mm; (xv) 30-35 mm; (xvi) 35-40 mm; (xvii) 40-45 mm; (xviii) 45-50 mm; and (xix) >50 mm; and/or (ii) the axial separation between a third point along a central longitudinal axis of the third quadrupole rod set, wherein the third point is in a plane with the downstream ends of the third electrodes, and a fourth point along a central longitudinal axis of the first quadrupole rod set, wherein the fourth point is in a plane with the upstream ends of the first electrodes, is selected from the group consisting of: (i) <1 mm; (ii) 1-2 mm; (iii) 2-3 mm; (iv) 3-4 mm; (v) 4-5 mm; (vi) 5-6 mm; (vii) 6-7 mm; (viii) 7-8 mm; (ix) 8-9 mm; (x) 9-10 mm; (xi) 10-15 mm; (xii) 15-20 mm; (xiii) 20-25 mm; (xiv) 25-30 mm; (xv) 30-35 mm; (xvi) 35-40 mm; (xvii) 40-45 mm; (xviii) 45-50 mm; and (xix) >50 mm.

The first quadrupole set preferably has a first axial length and the third quadrupole rod set preferably has a third axial length, and wherein either:

(i) the first axial length is substantially greater than the third axial length and/or the ratio of the first axial length to the third axial length is at least 2, 3, 4, 5, 6, 7, 8, 9, 10, 11, 12, 13, 14, 15, 16, 17, 18, 19, 20, 25, 30, 35, 40, 45 or 50; or (ii) the third axial length is substantially greater than the first axial length and/or the ratio of the third axial length to the first axial length is at least 2, 3, 4, 5, 6, 7, 8, 9, 10, 11, 12, 13, 14, 15, 16, 17, 18, 19, 20, 25, 30, 35, 40, 45 or 50.

The third quadrupole rod set preferably comprises a third central longitudinal axis and wherein:

(i) there is a direct line of sight along the third central longitudinal axis; and/or (ii) there is substantially no physical axial obstruction along the third central longitudinal axis; and/or (iii) ions transmitted, in use, along the third central longitudinal axis are transmitted with an ion transmission efficiency of substantially 100%.

According to an embodiment the first device is arranged and adapted to apply a third AC or RF voltage to the third quadrupole rod set.

According to an embodiment the third AC or RF voltage preferably has an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; (xi) 500-1000 V peak to peak; (xii) 1-2 kV peak to peak; (xiii) 2-3 kV peak to peak; (xiv) 3-4 kV peak to peak; (xv) 4-5 kV peak to peak; (xvi) 5-6 kV peak to peak; (xvii) 6-7 kV peak to peak; (xviii) 7-8 kV peak to peak; (xix) 8-9 kV peak to peak; (xx) 9-10 kV peak to peak; (xxi) 10-11 kV peak to peak; (xxii) 11-12 kV peak to peak; (xxiii) 12-13 kV peak to peak; (xxiv) 13-14 kV peak to peak; (xxv) 14-15 kV peak to peak; (xxvi) 15-16 kV peak to peak; (xxvii) 16-17 kV peak to peak; (xxviii) 17-18 kV peak to peak; (xxix) 18-19 kV peak to peak; (xxx) 19-20 kV peak to peak; and (xxxi) >20 kV.

According to an embodiment the third AC or RF voltage preferably has a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) > 10.0 MHz.

According to an embodiment the first AC or RF voltage and/or the second AC or RF voltage and/or the third AC or RF voltage preferably have substantially the same amplitude and/or the same frequency.

Alternatively, the amplitude and/or frequency of the first AC or RF voltage and/or the second AC or RF voltage and/or the third AC or RF voltage may differ by <10%, 10-20%, 20-30%, 30-40%, 40-50%, 50-60%, 60-70%, 70-80%, 80-90%, 90-100% or >100%.

The first device may be arranged and adapted to maintain the frequency and/or amplitude and/or phase of the first AC or RF voltage and/or the second AC or RF voltage and/or the third AC or RF voltage substantially constant with time during a mode of operation. Alternatively, the first device may be arranged and adapted to vary, increase, decrease or scan the frequency and/or amplitude and/or phase of the first AC or RF voltage and/or the second AC or RF voltage and/or the third AC or RF voltage in a mode of operation.

According to an embodiment an additional DC voltage and/or an additional RF voltage may be applied to the rods of the third quadrupole rod set in order to confine ions axially within the ion trap.

According to another aspect of the present invention there is provided a mass spectrometer comprising an ion trap as disclosed above.

The mass spectrometer preferably further comprises:

(a) an ion source arranged upstream of the ion trap, wherein the ion source is selected from the group consisting of: (i) an Electrospray ionisation ("ESI") ion source; (ii) an Atmospheric, Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; and (xviii) a Thermospray ion source; and/or (b) one or more ion guides arranged upstream and/or downstream of the ion trap; and/or (c) one or more ion mobility separation devices and/or one or more Field Asymmetric Ion Mobility Spectrometer devices arranged upstream and/or downstream of the ion trap; and/or (d) one or more ion traps or one or more ion trapping regions arranged upstream and/or downstream of the ion trap; and/or (e) one or more collision, fragmentation or reaction cells arranged upstream and/or downstream of the ion trap, wherein the one or more collision, fragmentation or reaction cells are selected from the group consisting of: (i) a Collisional Induced Dissociation ("CID") fragmentation device; (ii) a Surface Induced Dissociation ("SID") fragmentation device; (iii) an Electron Transfer Dissociation fragmentation device; (iv) an Electron Capture Dissociation fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an ion-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device and/or (f) one or more mass analysers arranged upstream and/or downstream of the ion trap, wherein the one or more mass analysers are selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (g) one or more energy analysers or electrostatic energy analysers arranged upstream and/or downstream of the ion trap; and/or (h) one or more ion detectors arranged upstream and/or downstream of the ion trap; and/or (i) one or more mass filters arranged upstream and/or downstream of the ion trap, wherein the one or more mass filters are selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; and (vii) a Time of Flight mass filter.

According to another aspect of the present invention there is provided a method of trapping ions comprising:

providing a first quadrupole rod set comprising a plurality of first electrodes;

providing a second quadrupole rod set comprising a plurality of second electrodes, the second quadrupole rod set being arranged downstream of the first quadrupole rod set;

applying a first AC or RF voltage to at least some of the first electrodes and at least some of the second electrodes such that a non-zero phase difference is maintained between at least some of the first electrodes and at least some corresponding axially adjacent second electrodes so that an axial pseudo-potential barrier is created between the first quadrupole rod set and the second quadrupole rod set; and applying one or more supplementary AC voltages to at least some of the first electrodes so that at least some ions within the first quadrupole rod set are resonantly excited in a radial direction and are subsequently ejected in an axial direction from the first quadrupole rod set.

According to another aspect of the present invention there is provided a method of mass spectrometry comprising a method of trapping ions as disclosed above.

According to another aspect of the present invention there is provided a computer program executable by the control system of a mass spectrometer, the mass spectrometer comprising an ion trap comprising a first quadrupole rod set comprising a plurality of first electrodes and a second quadrupole rod set comprising a plurality of second electrodes, the second quadrupole rod set being arranged downstream of the first quadrupole rod set, the computer program being arranged to cause the control system:

(i) to apply a first. AC or RF voltage to at least some of the first electrodes and at least some of the second electrodes such that, in use, a non-zero phase difference is maintained between at least some of the first electrodes and at least some corresponding axially adjacent second electrodes so that an axial pseudo-potential barrier is created between the first quadrupole rod set and the second quadrupole rod set; and (ii) to apply one or more supplementary AC voltages to at least some of the first electrodes so that at least some ions within the first quadrupole rod set are resonantly excited in a radial direction and are subsequently ejected in an axial direction from the first quadrupole rod set.

According to another aspect of the present invention there is provided a computer readable medium comprising computer executable instructions stored on the computer readable medium, the instructions being arranged to be executable by a control system of a mass spectrometer, the mass spectrometer comprising an ion trap comprising a first quadrupole rod set comprising a plurality of first electrodes and a second quadrupole rod set comprising a plurality of second electrodes, the second quadrupole rod set being arranged downstream of the first quadrupole rod set, wherein the instructions are arranged to cause the control system:

(i) to apply a first AC or RF voltage to at least some of the first electrodes and at least some of the second electrodes such that, in use, a non-zero phase difference is maintained between at least some of the first electrodes and at least some corresponding axially adjacent second electrodes so that an axial pseudo-potential barrier is created between the first quadrupole rod set and the second quadrupole rod set; and (ii) to apply one or more supplementary AC voltages to at least some of the first electrodes so that at least some ions within the first quadrupole rod set are resonantly excited in a, radial direction and are subsequently ejected in an axial direction from the first quadrupole rod set.

Preferably, the computer readable medium is selected from the group consisting of: (i) a ROM; (ii) an EAROM; (iii) an EPROM; (iv) an EEPROM; (v) a flash memory; and (vi) an optical disk.

According to another aspect of the present invention there is provided an ion trap comprising:

a first multipole rod set comprising a first plurality of electrodes;

a device which is arranged and adapted to create an axial pseudo-potential barrier at a position along the length of and/or at the exit of the first multipole rod set; and a device which is arranged and adapted to apply a supplementary AC voltage to at least some of the first plurality of electrodes so that at least some ions within the first multipole rod set are resonantly excited and are non-adiabatically ejected in an axial direction from the first multipole rod set.

The first multipole rod set preferably comprises a quadrupole, hexapole or higher order rod set. The various embodiments described above apply equally to this aspect of the present invention.

According to another aspect of the present invention there is provided a method of trapping ions comprising:

providing a first multipole rod set comprising a first plurality of electrodes;

creating an axial pseudo-potential barrier at a position along the length of and/or at the exit of the first multipole rod set; and applying a supplementary AC voltage to at least some of the first plurality of electrodes so that at least some ions within the first multipole rod set are resonantly excited and are non-adiabatically ejected in an axial direction from the first multipole rod set.

According to another aspect of the present invention there is provided an ion trap comprising:

a first multipole rod set comprising a first plurality of electrodes;

one or more vane electrodes arranged along the length of the first multipole;

a device which is arranged and adapted to apply an AC or RF voltage to the one or more vane electrodes so as to create an axial pseudo-potential barrier at a position along the length of and/or at the exit of the first multipole rod set; and a device which is arranged and adapted to apply a supplementary AC voltage to at least some of the first plurality of electrodes so that at least some ions within the first multipole rod set are resonantly excited and are non-adiabatically ejected in an axial direction from the first multipole rod set.

The first multipole rod set preferably comprises a quadrupole, hexapole or higher order rod set. The various embodiments described above apply equally to this aspect of the present invention.

According to another aspect of the present invention there is provided a method of trapping ions comprising:

providing a first multipole rod set comprising a first plurality of electrodes;

providing one or more vane electrodes along the length of the first multipole;

applying an AC or RF voltage to the one or more vane electrodes so as to create an axial pseudo-potential barrier at a position along the length of and/or at the exit of the first multipole rod set; and applying a supplementary AC voltage to at least some of the first plurality of electrodes so that at least some ions within the first multipole rod set are resonantly excited and are non-adiabatically ejected in an axial direction from the first multipole rod set.

According to another aspect of the present invention there is provided an ion trap comprising:

a first multipole rod set comprising a first plurality of electrodes;

a second multipole rod set comprising a second plurality of electrodes, the second quadrupole rod set being arranged downstream of the first quadrupole rod set and wherein the second plurality of electrodes are not co-axial with the first plurality of electrodes;

a device which is arranged and adapted to apply a first AC or RF voltage to at least some of the first electrodes and a second AC or RF voltage to at least some of the second electrodes so that an axial pseudo-potential barrier is formed between the first multipole rod set and the second multipole rod set;

a device which is arranged and adapted to apply a supplementary AC voltage tout least some of the first plurality of electrodes so that at least some ions within the first multipole rod set are resonantly excited and are non-adiabatically ejected in an axial direction from the first multipole rod set.

The first multipole rod set and/or the second multipole rod set preferably comprises a quadrupole, hexapole or higher order rod set. The various embodiments described above apply equally to this aspect of the present invention.

According to another aspect of the present invention there is provided a method of trapping ions comprising:

providing a first multipole rod set comprising a first plurality of electrodes;

providing a second multipole rod set comprising a second plurality of electrodes, the second quadrupole rod set being arranged downstream of the first quadrupole rod set and wherein the second plurality of electrodes are not co-axial with the first plurality of electrodes;

applying a first AC or RF voltage to at least some of the first electrodes and a second AC or RF voltage to at least some of the second electrodes so that an axial pseudo-potential barrier is formed between the first multipole rod set and the second multipole rod set;

applying a supplementary AC voltage to at least some of the first plurality of electrodes so that at least some ions within the first multipole rod set are resonantly excited and are non-adiabatically ejected in an axial direction from the first multipole rod set.

Although the preferred embodiment as described above relates to one, two, three or more than three quadrupole devices, further less preferred embodiments are contemplated wherein the first quadrupole rod set and/or the second quadrupole rod set and/or the third quadrupole rod set may be replaced or substituted with a hexapole, octapole or higher order rod set.

The preferred embodiment comprises a high transmission RF quadrupole ion guide and/or ion trap. Unlike some known devices, the ion trap according to the preferred embodiment does not have any physical axial obstructions along the ion guiding region and hence has a high ion transmission efficiency in operation.

The applied electrical field or fields may according to one embodiment be switched between two modes of operation wherein in a first mode of operation the device preferably onwardly transmits a mass or mass to charge ratio range of ions (i.e. the device preferably acts as a quadrupole mass filter) and in a second mode of operation the device preferably acts as a linear ion trap wherein ions may be mass or mass to charge ratio selectively displaced in at least one radial direction. The ions are preferably ejected non-adiabatically in the axial direction and are preferably transmitted across one or more radially dependant axial RF or combined RF and DC barriers.

The preferred embodiment relates to a linear ion trap comprising a segmented quadrupole (or higher order) rod set wherein there is a phase difference of 180° between the RF voltage applied to the rods of the main quadrupole rod set and the RF voltage applied to the rods of a post-filter which is arranged downstream of the main quadrupole rod set. The 180° phase difference between the main quadrupole and the post-filter preferably results in an axial pseudo-potential barrier being formed which preferably increases in strength radially away from the centre. According to an embodiment, ions are preferably resonantly excited to a greater radius within the main quadrupole rod set and hence when they arrive at the post-filter the ions will be reflected by the pseudo-potential barrier. However, the pseudo-potential approximation only holds whilst the ion motion remains adiabatic. At a certain radius an ion which arrives at the post-filter will interact with the pseudo-potential barrier at the point where the pseudo-potential approximation no longer holds. The ion will then gain energy and may according to an embodiment gain sufficient axial kinetic energy such that the ion escapes past the pseudo-potential barrier and hence is ejected axially from the device.

Figure 2A:
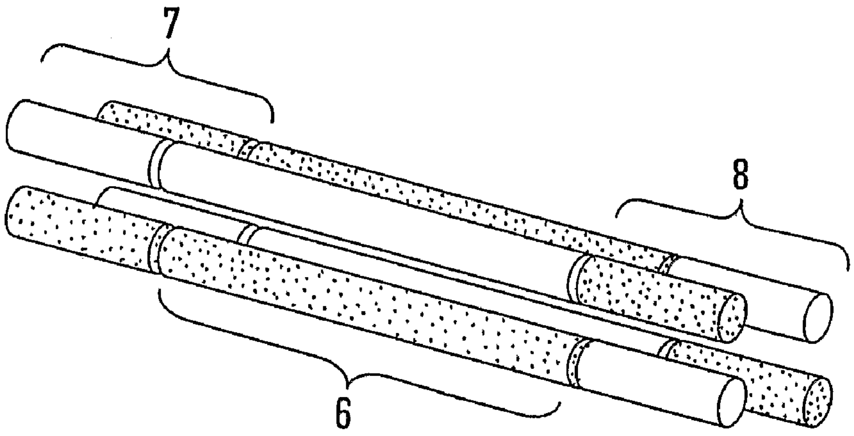
Figure 2B:
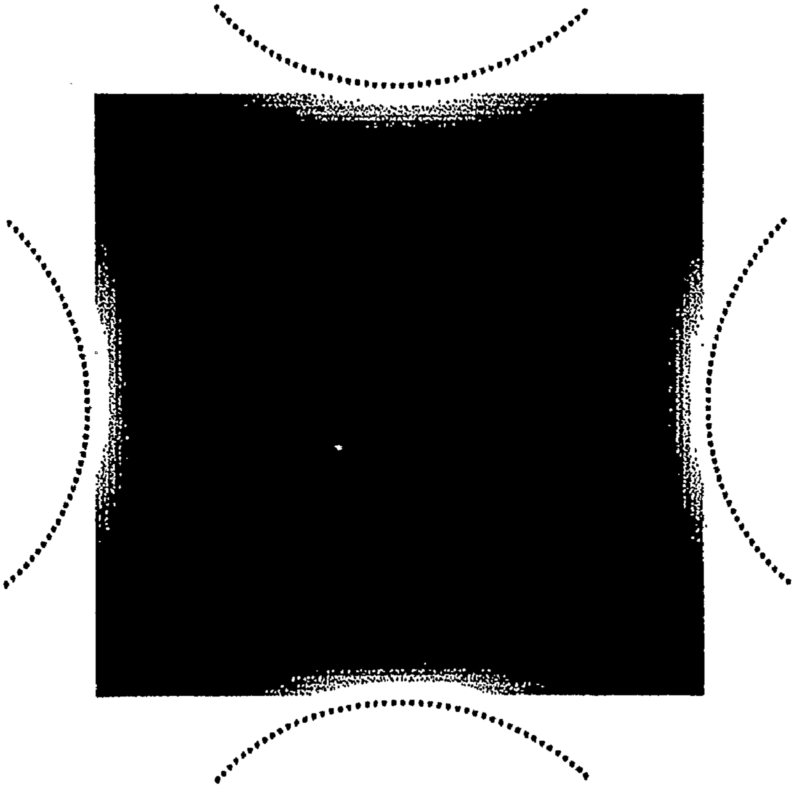
Figure 2C:
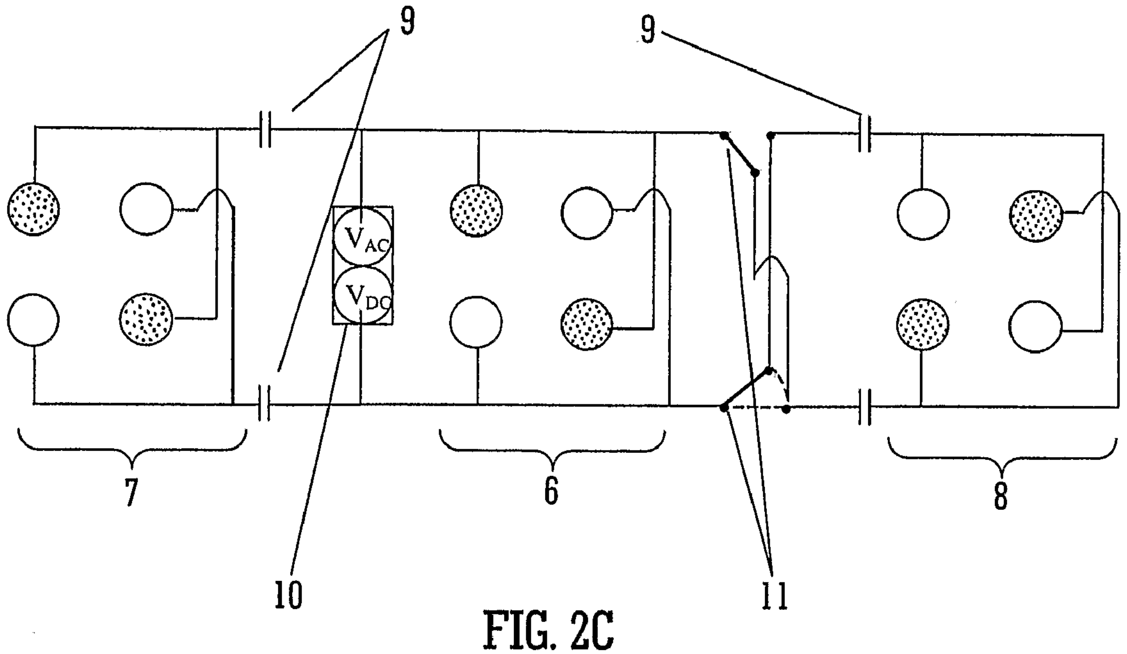
Figure 2D:
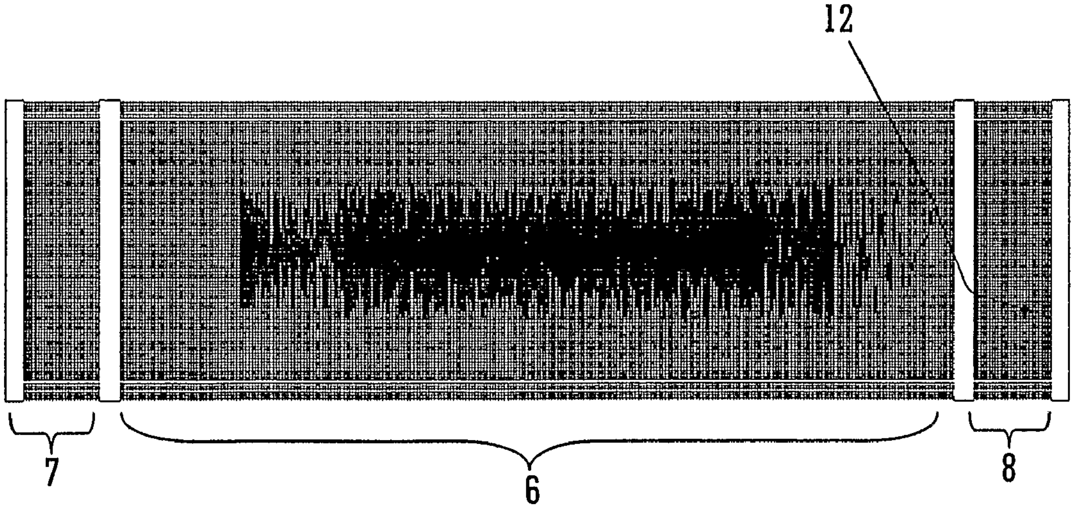
Figure 2E:
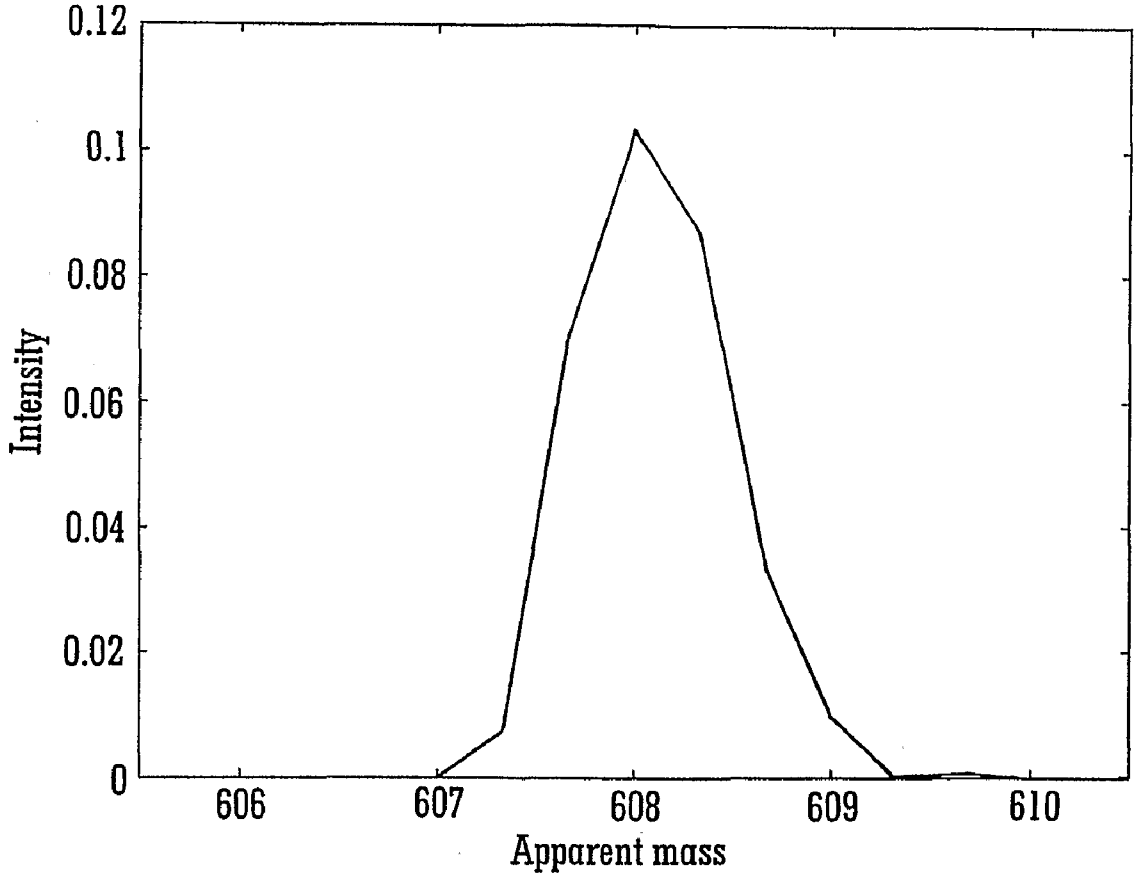
Figure 3A:
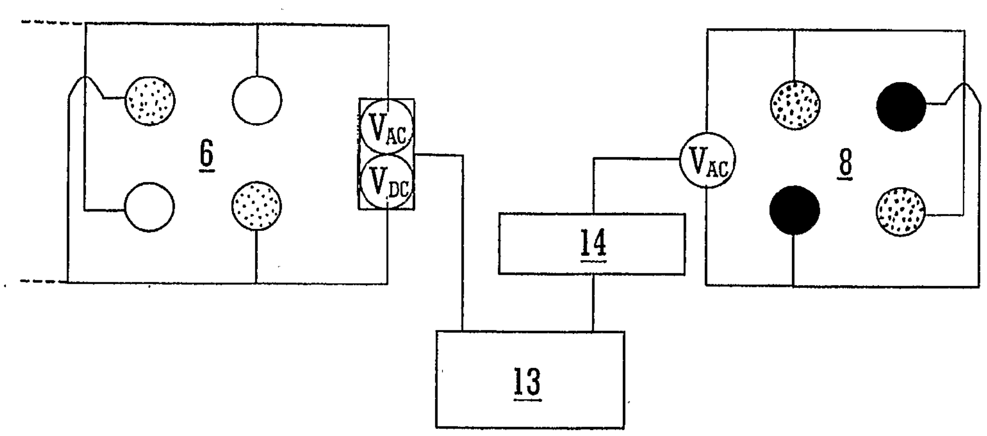
Figure 3B:
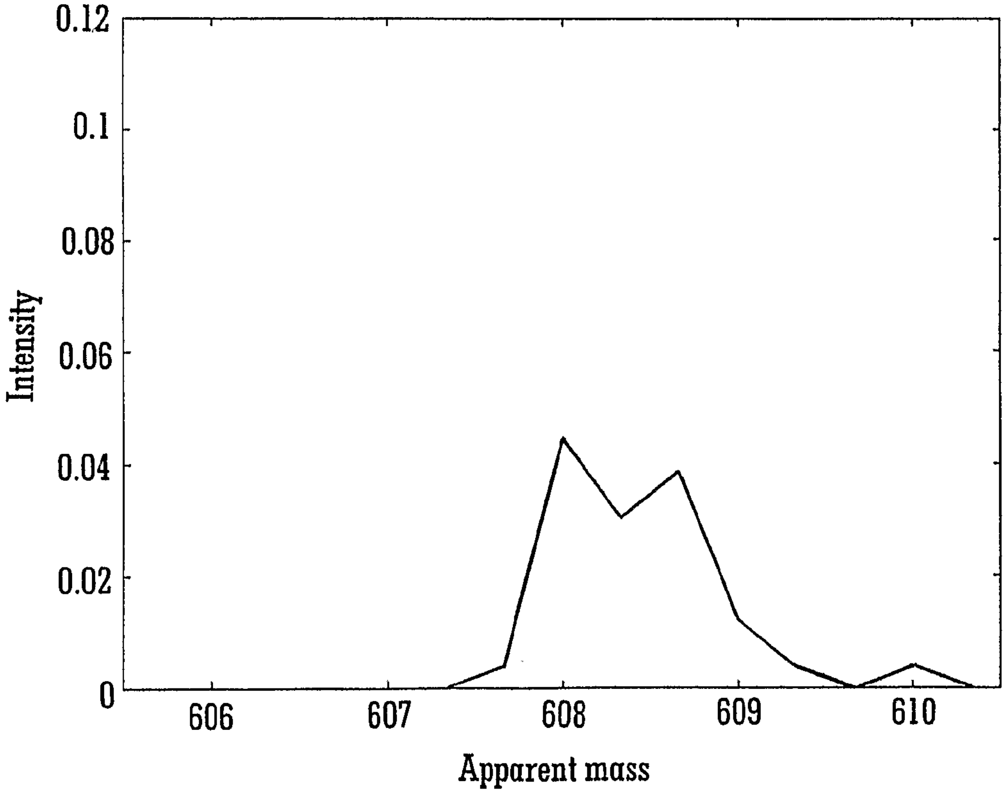
Figure 4A:
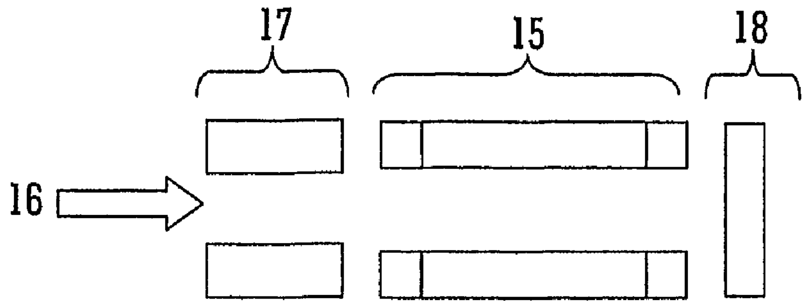
Figure 4B:
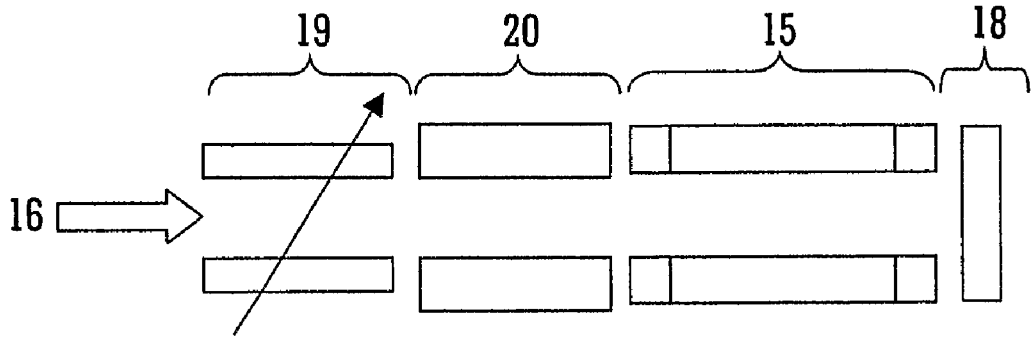
Figure 4C:
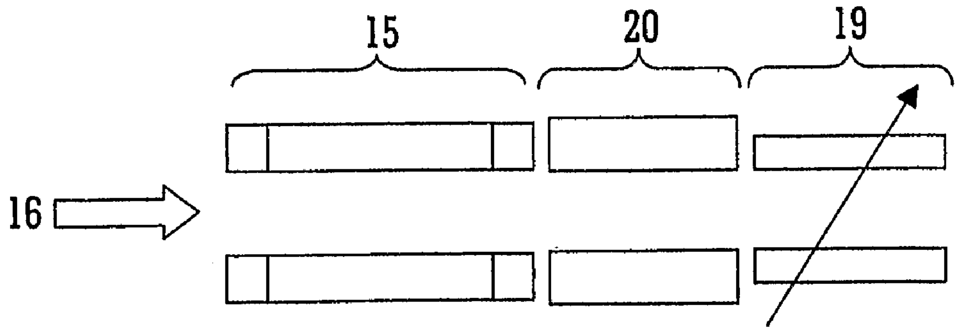

Various embodiments of the present invention will now be described together with other arrangements given for illustrative purposes only, by way of example only, and with reference to the accompanying drawings in which:

FIG. 1A shows a conventional quadrupole rod set assembly wherein the same phase of an RF voltage is applied to axially adjacent rods and FIG. 1B shows a electrical circuit for supplying RF voltages to the conventional quadrupole rod set assembly;

FIG. 2A shows a preferred embodiment of the present invention wherein there is a 180° phase difference between the RF voltage applied to the rods of the main quadrupole rod set and axially adjacent rods of a post-filter arranged downstream of the main quadrupole rod set such that an axial pseudo-potential barrier is created between the main quadrupole rod set and the post-filter, FIG. 2B shows a heat map of the pseudo-potential barrier height formed between the central quadrupole and the post-filter, FIG. 2C shows an electrical circuit which may be used to switch the quadrupole assembly between a conventional mode of operation and an ion trapping mode of operation according to an embodiment of the present invention, FIG. 2D shows a SIMION (RTM) simulation of an ion being radially excited and then non-adiabatically ejected from a quadrupole assembly according to a preferred embodiment of the present invention and FIG. 2E shows a simulated mass spectrum obtained according to an embodiment of the present invention;

FIG. 3A shows an electrical circuit according to another embodiment of the present invention wherein the phase difference in the RF voltage applied to the electrodes of the central quadrupole rod set and the RF voltage applied to the electrodes of the post-filter may be varied and FIG. 3B shows a simulated mass spectrum according to an embodiment of the present invention; and FIG. 4A shows a quadrupole assembly according to an embodiment of the present invention wherein the quadrupole assembly is used as a stand alone mass analyser, FIG. 4B shows a quadrupole assembly according to an embodiment of the present invention wherein the quadrupole assembly is used as a mass analyser as part of a hybrid arrangement and FIG. 4C shows a quadrupole assembly according to an embodiment of the present invention wherein the quadrupole assembly is used as a separator in a hybrid geometry.

An ion trap according to a preferred embodiment will now be described in more detail with reference to FIG. 2A. The device preferably comprises a quadrupole pre-filter 7, a central quadrupole 6 and a quadrupole post-filter 8. Ions are preferably allowed periodically to enter the preferred device by either pulsing the pre-filter 7 (or another ion-optical device (not shown)) which is preferably arranged upstream of the central quadrupole 6.

Ions are preferably confined radially within the quadrupole pre-filter 7, the central quadrupole 6 and the quadrupole post-filter 8 by applying RF voltages to the electrodes forming the quadrupole pre-filter 7, the central quadrupole 6 and the quadrupole post-filter 8. One pair of electrodes (shaded) of the quadrupole pre-filter 7, the central quadrupole 6 and the quadrupole post-filter 8 is preferably connected to one phase of the applied RF voltage whilst the other pair of, electrodes (white) of the quadrupole pre-filter 7, the central quadrupole 6 and the quadrupole post-filter 8 is preferably connected to the opposite phase of the applied RF voltage. According to an embodiment a 180° phase difference is preferably maintained between the RF voltage applied to the rods of the post-filter 8 relative to the RF voltage applied to the corresponding adjacent rods of the central quadrupole 6. No phase difference is preferably maintained between axially adjacent rods of the central quadrupole 6 and the pre-filter 7.

Other embodiments are also contemplated which will be described in more detail below wherein the phase difference between the rods of the post-filter 8 relative to the RF voltage applied to the corresponding axially adjacent rods of the central quadrupole 6 may be less than 180°.

The phase difference between the RF voltage applied to the rods of the post-filter 8 relative to the RF voltage applied to the corresponding adjacent rods of the central quadrupole 6 preferably results in an axial pseudo-potential barrier being generated or created. The pseudo-potential barrier preferably increases radially towards the rods. An RF voltage is preferably maintained on the rods on either side of the axial pseudo-potential barrier and this preferably ensures that ions are confined radially upstream and downstream of the axial pseudo-potential barrier.

FIG. 2B shows a heat-map which indicates the relative height of the axial pseudo-potential barrier. The dotted lines indicate the positions of the quadrupole rods.

FIG. 2C shows an electrical circuit which may according to an embodiment of the present invention be used to switch the quadrupole arrangement between a conventional mode of operation wherein the RF voltage is applied to the electrodes of the quadrupole post-filter electrode 8 so that axially adjacent rods of the central quadrupole rod set 6 and the quadrupole post-filter 8 are in phase (i.e. a conventional mode of operation) and a mode of operation according to a preferred embodiment of the present invention wherein a phase difference of 180° is maintained between the RF voltage applied to the electrodes of the quadrupole post-filter 8 and axially adjacent rods of the central quadrupole rod set 6 (and the quadrupole pre-filter 7).

Ions are preferably confined in a first axial direction within the quadrupole arrangement by applying a DC voltage to the rods of the quadrupole pre-filter 7. Ions are also preferably confined in a second different axial direction within the quadrupole arrangement by the axial pseudo-potential barrier which is preferably created between the central quadrupole 6 and the quadrupole post-filter 8. An additional barrier component may preferably added to the quadrupole post-filter 8 by additionally applying a DC voltage to the electrodes of the quadrupole post-filter 8 so that ions experience an axial pseudo-potential barrier in combination with a real DC potential barrier in the second axial direction. Other embodiments are also contemplated wherein DC and/or RF voltages may be applied to one or more vane electrodes in order to trap ions axially within the ion trap. The vane electrodes are preferably auxiliary rod electrodes which are arranged parallel to the main rod electrodes. The vane electrodes may have a shorter axial length than the main rod electrodes.

Ions preferably lose kinetic energy within the quadrupole arrangement due to collisions with background gas so that after some period of time the ions can be considered to be at or near thermal energies. Therefore, an ion cloud may be considered as existing which is substantially close to the central axis of the quadrupole arrangement.

According to an embodiment the central axis of the quadrupole post-filter 8 may be displaced relative to the central axis of the central quadrupole rod set 6 so that the central longitudinal axis of the central quadrupole rod set 6 is not co-axial with the central longitudinal axis of the quadrupole post-filter 8. According to this embodiment, the offset between the axis of the central quadrupole rod set 6 and the quadrupole post-filter 8 ensures that the amplitude of the pseudo-potential barrier which is created between the central quadrupole 6 and the quadrupole post-filter 8 is non-zero along the central or optic axis of the central quadrupole 6. As a result, it is not necessary to apply a DC voltage to the electrodes of the quadrupole post-filter 8 in order to confine ions axially within the central quadrupole rod set 6. Instead, it is sufficient to apply RF voltages only to the electrodes of the quadrupole post-filter 8.

One way of increasing the radial motion of ions within the central quadrupole rod set 6 is to apply a small supplementary AC voltage or tickle voltage between one of the pairs of electrodes forming the central quadrupole 6. The supplementary AC voltage preferably produces an electric field between the electrodes which preferably affects the motion of ions between the electrodes thereby causing ions to oscillate at the frequency of the applied AC electric field. If the frequency of the applied AC electric field matches the secular frequency of the ions within the device then the ion motion becomes resonant with the applied field and the amplitude of ion motion becomes larger. Ions which arrive at the post-filter 8 will generally be reflected by the RF or combined RF and DC barrier. However, ions which have been excited to a sufficiently large radius will intercept the RF barrier at a point where the adiabatic approximation no longer applies. In other words, the ion motion will become dominated by the micro motion due to the applied RF field rather than the secular motion. Under these conditions the ions can gain significantly more kinetic energy from the RF field than would normally be the case under the adiabatic approximation. As a result the ions may gain sufficient axial kinetic energy to allow them to pass beyond the axial pseudo-potential barrier between the central quadrupole 6 and the post-filter 8 thereby enabling the ions to enter the post-filter 8 and hence to be ejected axially from the ion trap.

Other methods of resonantly exciting ions within the central quadrupole rod set 6 are also contemplated.

FIG. 2D shows the results of a single SIMION 8 (RTM) simulation of the preferred device as shown in FIG. 2A and shows an ion being ejected axially from the preferred ion trap.

FIG. 2E shows a simulated mass spectrum for the preferred device as shown in FIG. 2A. For the simulation an ensemble of singly charged Reserpine ions each having a mass to charge ratio of 609 were modelled as being present within the preferred device with random initial axial positions and thermally distributed energies. The RF amplitude was ramped such that for a q-factor of 0.84 the corresponding mass was scanned from mass 595 up to 615. The RF amplitude was scanned at a rate equivalent to 1000 Da/sec. The auxiliary or tickle AC voltage was modelled as having a frequency of 380 kHz and an amplitude of 0.2 V. A DC voltage of +4 V was modelled as being applied to the electrodes of the post-filter 8. The simulations show a mass ejection profile corresponding to a peak width of 1 mass unit at half height.

According to other embodiments of the present invention the phase difference between the rods of the central quadrupole 6 and the post-filter 8 may be arranged to be variable between 0 and 180 degrees. This allows the amplitude of the pseudo-potential RF barrier to be tuned. SIMION (RTM) calculations indicate that this enables the average axial kinetic energy of transmitted ions to be reduced from e.g. 93 eV with a 180° phase shift to 8.4 eV with a 45° phase shift between the central rod set 6 and the post-filter rod set 8. The variation of the phase in this manner allows an additional level of control over the performance of the device.

FIG. 3A shows a schematic diagram of an electronic circuit which may be used to provide a variable phase difference between the central quadrupole 6 and the post-filter 8. An AC source 13 is shown connected to the rods of the central quadrupole 6 and the post-filter 8 together with a phase delay device 14.

FIG. 3B shows a simulated mass spectrum for a device according to an embodiment wherein the phase difference between the RF voltage applied to the rods of the central quadrupole 6 rod set and the RF voltage applied to the rods of the post-filter 8 was set at 45°. An ensemble of singly charged Reserpine ions having a mass to charge ratio of 609 were modelled as being present within the device with random initial axial positions and thermally distributed energies. The RF, AC and DC voltages were as for the previous simulation.

For the embodiments described above ions may be sequentially released from the preferred device by varying the resonant mass to charge ratio with time. This can be done in various ways. For example, the frequency of the supplementary AC voltage or tickle voltage may be varied as a function of time whilst maintaining the amplitude and frequency of the main RF voltage and substantially constant.

According to another embodiment the amplitude of the main RF voltage may be varied as a function of time whilst the frequency of the supplementary AC voltage or tickle voltage and/or the frequency of the main RF voltage may be maintained substantially constant.

According to another embodiment the frequency of the main RF voltage may be varied as a function of time whilst the frequency of the supplementary AC voltage or tickle voltage and the amplitude of the main RF voltage may be maintained substantially constant.

According to another embodiment the frequency of the main RF voltage, the frequency of the supplementary AC voltage or tickle voltage and the amplitude of the main RF voltage may be varied in any combination.

The preferred device may be operated in a mode of operation as a linear ion trap and in an alternative mode of operation as a quadrupole mass filter in the standard manner. The preferred device may be switched between the two modes of operation by switching the appropriate RF and resolving DC voltages applied to the various electrodes.

The preferred device may be used for the mass analysis of precursor ions and/or fragment ions. According to an embodiment the preferred device may be operated as a mass spectrometer in its own right or as part of a mass spectrometer system. The preferred device may be combined with one or more ion guides, one or more mass filters or mass analysers, one or more ion traps, one or more fragmentation devices, one or more ion mobility spectrometers or separators, or any combination thereof.

FIG. 4A shows an embodiment of the present invention wherein an ion trap according to the preferred embodiment 15 is preceded by an ion source 16 and is followed by an ion detector 18. At the upstream end of the mass spectrometer, the ion source 16 may AO comprise a pulsed ion source such as a Laser Desorption Ionisation ("LDI") ion source, a Matrix Assisted Laser Desorption Ionisation ("MALDI") ion source or an Desorption Ionisation on Silicon ("DIOS") ion sources. Alternatively, a continuous ion source may be used in which case an additional ion trap 17 may also be provided. The additional ion trap 17 is preferably arranged upstream of the ion trap 15 according to the preferred embodiment and is preferably arranged to store ions which are received from the ion source 16. The additional ion trap 17 preferably periodically releases ions so that the ions are onwardly transmitted to the ion trap 15 according to the preferred embodiment. The continuous ion source may comprise an Electrospray Ionisation ("ESI") ion source, an Atmospheric Pressure Chemical Ionisation ("APCI") ion source, an Electron Impact ("EI") ion source, an Atmospheric Pressure Photon Ionisation ("APPI") ion source, a Chemical Ionisation ("CI") ion source, a Desorption Electrospray Ionisation ("DESI") ion source, an Atmospheric Pressure MALDI ("AP-MALDI") ion source, a Fast Atom Bombardment ("FAB") ion source, a Liquid Secondary Ion Mass Spectrometry ("LSIMS") ion source, a Field Ionisation ("FI") ion source or a Field Desorption ("FD") ion source. Other continuous or pseudo-continuous ion sources may also be used.

FIG. 4B shows an embodiment wherein an ion trap 15 according to the preferred embodiment is preceded by a fragmentation device 20 and a mass analyser or mass filter 19. The fragmentation device 20 is preferably arranged downstream of the mass analyser or mass filter 19 and upstream of the ion trap 15 according to the preferred embodiment. In this geometry the preferred device 15 may be preceded by an additional ion trap (not shown). The additional ion trap is preferably arranged to store and periodically release ions. Alternatively, the fragmentation device 20 may be configured to operate as an ion trap. This geometry allows ions which have been mass analysed to then be fragmented. The fragment ions which preferably emerge from the fragmentation device 20 can then be mass analysed by the ion trap 15 according to the preferred embodiment. The ions which are axially ejected from the preferred ion trap 15 are then preferably detected by an ion detector 18 which is preferably arranged downstream of the preferred ion trap 15.

FIG. 4C shows an embodiment wherein an ion trap 15 according to the preferred embodiment is preferably arranged upstream of a fragmentation device 20 and a mass filter or mass analyser 19. In this geometry the ion trap 15 according to the preferred embodiment may be preceded by an additional ion trap (not shown). The additional ion trap may be arranged to store and periodically release ions. This geometry preferably allows ions to be ejected axially from the preferred ion trap 15 in a mass or mass to charge ratio dependent manner. Ions which are ejected axially from the preferred ion trap 15 are then preferably fragmented in the fragmentation device 20 which is preferably arranged downstream of the preferred ion trap 15. Fragment ions which are formed in the fragmentation device 20 are then preferably analysed by the mass filter or mass analyser 19 which is preferably arranged downstream of the fragmentation device 20. This geometry preferably facilitates parallel MS/MS experiments wherein ions exiting the preferred ion trap 15 in a mass dependent manner are fragmented allowing the assignment of fragment ions to precursor ions with a high duty cycle.

The mass analyser 19 shown in the embodiment shown in FIG. 4C may comprise a Time of Flight mass analyser, an ion trap mass analyser, a magnetic sector mass analyser, a quadrupole mass analyser or a mass analyser employing Fourier transforms.

Although the present invention has been described with reference to preferred embodiments, it will be understood by those skilled in the art that various changes in form and detail may be made without departing from the scope of the invention as set forth in the accompanying claims.

The invention claimed is:

1. An ion trap comprising:

a first quadrupole rod set comprising a plurality of first electrodes;

a second quadrupole rod set comprising a plurality of second electrodes, said second quadrupole rod set being arranged downstream of said first quadrupole rod set;

a first device which is arranged and adapted to apply a first RF voltage to at least some of said first electrodes and at least some of said second electrodes such that in a first mode of operation a non-zero phase difference is maintained between at least some of said first electrodes and at least some corresponding axially adjacent second electrodes so that an axial pseudo-potential barrier is created between said first quadrupole rod set and said second quadrupole rod set; and a second device which is arranged and adapted to apply one or more supplementary AC voltages to at least some of said first electrodes so that at least some ions within said first quadrupole rod set are resonantly excited in a radial direction so that they interact with the pseudopotential barrier at a point where the pseudopotential approximation no longer holds and are subsequently ejected in an axial direction from said first quadrupole rod set.

2. An ion trap as claimed in claim 1, wherein a central longitudinal axis of said first quadrupole rod set is axially offset from a central longitudinal axis of said second quadrupole rod set.

3. An ion trap as claimed in claim 1, wherein either:

(i) said first quadrupole rod set and said second quadrupole rod set comprise electrically isolated sections of the same set of electrodes; or (ii) said first quadrupole rod set comprises a region of a set of electrodes having a dielectric coating and said second quadrupole set comprises a different region of said same set of electrodes.

4. An ion trap as claimed in claim 1, wherein said second device is arranged and adapted to apply said one or more supplementary AC voltages in order to excite in a mass or mass to charge ratio selective manner at least some ions radially within said first quadrupole rod set so that said ions increase their radial motion within said first quadrupole rod set.

5. An ion trap as claimed in claim 1, wherein said second device is arranged and adapted to vary a frequency, amplitude or phase of said one or more supplementary AC voltages applied to at least some of said first electrodes.

6. An ion trap as claimed in claim 1, wherein in a mode of operation ions are ejected substantially non-adiabatically from said ion trap in an axial direction.

7. An ion trap as claimed in claim 1, wherein said second device is arranged and adapted to resonantly excite at least some ions in a radial direction so that said ions are non-adiabatically ejected from said first quadrupole rod set in an axial direction.

8. An ion trap as claimed in claim 7, wherein:

$$\eta = \frac{2q|\nabla E_0|}{m\Omega^2}$$

wherein η is an adiabaticity parameter, q is charge, $E_0$ is electric field, m is mass and Ω is the RF frequency; and wherein ions are deemed as being non-adiabatically ejected from said first quadrupole rod set when $\eta>0.3$.

9. An ion trap as claimed in claim 1, further comprising a third device which is arranged and adapted to apply either:

(i) one or more DC voltages to one or more of said second electrodes so as to assist in confining at least some ions axially within said first quadrupole rod set; or (ii) one or more additional AC voltages to one or more of said second electrodes so as to assist in confining at least some ions axially within said first quadrupole rod set.

10. An ion trap as claimed in claim 9, wherein said third device is arranged and adapted either:

(i) to apply said one or more DC voltages to one or more of said second electrodes so as to vary an amplitude of a DC potential barrier whilst ions are being ejected axially from said ion trap in a mode of operation; or (ii) to apply said one or more additional AC voltages to one or more of said second electrodes so as to vary an amplitude of a barrier field whilst ions are being ejected axially from said ion trap in a mode of operation.

11. A mass spectrometer comprising an ion trap, the ion trap comprising:

a first quadrupole rod set comprising a plurality of first electrodes;

a second quadrupole rod set comprising a plurality of second electrodes, said second quadrupole rod set being arranged downstream of said first quadrupole rod set;

a first device which is arranged and adapted to apply a first RF voltage to at least some of said first electrodes and at least some of said second electrodes such that in a first mode of operation a non-zero phase difference is maintained between at least some of said first electrodes and at least some corresponding axially adjacent second electrodes so that an axial pseudo-potential barrier is created between said first quadrupole rod set and said second quadrupole rod set; and a second device which is arranged and adapted to apply one or more supplementary AC voltages to at least some of said first electrodes so that at least some ions within said first quadrupole rod set are resonantly excited in a radial direction so that they interact with the pseudopotential barrier at a point where the pseudopotential approximation no longer holds and are subsequently elected in an axial direction from said first quadrupole rod set.

12. A method of trapping ions comprising:

providing a first quadrupole rod set comprising a plurality of first electrodes;

providing a second quadrupole rod set comprising a plurality of second electrodes, said second quadrupole rod set being arranged downstream of said first quadrupole rod set;

applying a first RF voltage to at least some of said first electrodes and at least some of said second electrodes such that a non-zero phase difference is maintained between at least some of said first electrodes and at least some corresponding axially adjacent second electrodes so that an axial pseudo-potential barrier is created between said first quadrupole rod set and said second quadrupole rod set; and applying one or more supplementary AC voltages to at least some of said first electrodes so that at least some ions within said first quadrupole rod set are resonantly excited in a radial direction so that they interact with the pseudopotential barrier at a point where the pseudopotential approximation no longer holds and are subsequently ejected in an axial direction from said first quadrupole rod set.

13. A method of mass spectrometry comprising a method of trapping ions, the method of trapping ions comprising:

providing a first quadrupole rod set comprising a plurality of first electrodes;

providing a second quadrupole rod set comprising a plurality of second electrodes, said second quadrupole rod set being arranged downstream of said first quadrupole rod set;

applying a first RF voltage to at least some of said first electrodes and at least some of said second electrodes such that a non-zero phase difference is maintained between at least some of said first electrodes and at least some corresponding axially adjacent second electrodes so that an axial pseudo-potential barrier is created between said first quadrupole rod set and said second quadrupole rod set; and applying one or more supplementary AC voltages to at least some of said first electrodes so that at least some ions within said first quadrupole rod set are resonantly excited in a radial direction so that they interact with the pseudopotential barrier at a point where the pseudopotential approximation no longer holds and are subsequently ejected in an axial direction from said first quadrupole rod set.

14. A computer readable medium comprising computer executable instructions stored on said computer readable medium, said instructions being arranged to be executable by a control system of a mass spectrometer, said mass spectrometer comprising an ion trap comprising a first quadrupole rod set comprising a plurality of first electrodes and a second quadrupole rod set comprising a plurality of second electrodes, said second quadrupole rod set being arranged downstream of said first quadrupole rod set, wherein said instructions are arranged to cause said control system:

(i) to apply a first RF voltage to at least some of said first electrodes and at least some of said second electrodes such that, in use, a non-zero phase difference is maintained between at least some of said first electrodes and at least some corresponding axially adjacent second electrodes so that an axial pseudo-potential barrier is created between said first quadrupole rod set and said second quadrupole rod set; and (ii) to apply one or more supplementary AC voltages to at least some of said first electrodes so that at least some ions within said first quadrupole rod set are resonantly excited in a radial direction so that they interact with the pseudopotential barrier at a point where the pseudopotential approximation no longer holds and are subsequently ejected in an axial direction from said first quadrupole rod set.

15. An ion trap comprising:

a first multipole rod set comprising a first plurality of electrodes;

a second multipole rod set comprising a second plurality of electrodes, said second multipole rod set being arranged downstream of said first multipole rod set and wherein said second plurality of electrodes are not co-axial with said first plurality of electrodes;

a device which is arranged and adapted to apply a first RF voltage to at least some of said first electrodes and a second RF voltage to at least some of said second electrodes so that an axial pseudo-potential barrier is formed between said first multipole rod set and said second multipole rod set; and a device which is arranged and adapted to apply a supplementary AC voltage to at least some of said first plurality of electrodes so that at least some ions within said first multipole rod set are resonantly excited so that they interact with the pseudopotential barrier at a point where the pseudopotential approximation no longer holds and are non-adiabatically ejected in an axial direction from said first multipole rod set.

* * * * *